US011927464B2

(12) United States Patent
Elvekjær et al.

(10) Patent No.: US 11,927,464 B2
(45) Date of Patent: Mar. 12, 2024

(54) METHOD FOR DETERMINING A FLUID FLOW RATE THROUGH A PUMP

(71) Applicant: Grundfos Holding A/S, Bjerringbro (DK)

(72) Inventors: Peter Elvekjær, Bjerringbro (DK); Jesper Thørring Damgaard, Bjerringbro (DK); Carsten Christensen, Bjerringbro (DK)

(73) Assignee: Grundfos Holding A/S, Bjerringbro (DK)

( * ) Notice: Subject to any disclaimer, the term of this patent is extended or adjusted under 35 U.S.C. 154(b) by 563 days.

(21) Appl. No.: 17/098,100

(22) Filed: Nov. 13, 2020

(65) Prior Publication Data

US 2021/0148739 A1 May 20, 2021

(30) Foreign Application Priority Data

Nov. 15, 2019 (EP) .................................. 19209453

(51) Int. Cl.
*F04D 15/00* (2006.01)
*F02D 41/14* (2006.01)
(Continued)

(52) U.S. Cl.
CPC ........... *G01F 1/05* (2013.01); *F02D 41/1401* (2013.01); *F04D 15/0088* (2013.01);
(Continued)

(58) Field of Classification Search
CPC ............. F04B 2205/09; F02D 41/1401; H02P 25/089; H02P 29/60; H02P 6/34
See application file for complete search history.

(56) References Cited

U.S. PATENT DOCUMENTS

2004/0039243 A1   2/2004   Gill et al.
2005/0043921 A1   2/2005   Zhu et al.
(Continued)

FOREIGN PATENT DOCUMENTS

EP   3186514 A   7/2017

OTHER PUBLICATIONS

R. Zhang, Z. Yuan and X. Shao, "A New Combined CNN-RNN Model for Sector Stock Price Analysis," 2018 IEEE 42nd Annual Computer Software and Applications Conference (COMPSAC), Tokyo, Japan, 2018, pp. 546-551, doi: 10.1109/COMPSAC.2018.10292. (Year: 2018).*

*Primary Examiner* — Courtney D Heinle
*Assistant Examiner* — Andrew J Marien
(74) *Attorney, Agent, or Firm* — DeWitt LLP; Brian R. Pollack, Esq.

(57) ABSTRACT

Computer-implemented methods are disclosed for determining a flow rate of fluid flow at a target time through a pump, such as a centrifugal pump, the pump being driven by a pump motor. An illustrative method includes, in some aspects: receiving at least one set of previous parameter values including a first previous parameter value indicative of a first operational parameter of the pump motor at a previous time, earlier than the target time, and a second previous parameter value indicative of a second operational parameter of the pump motor at the previous time, and receiving a current set of parameter values including a first current parameter value indicative of the first operational parameter of the pump motor at the target time and a second current parameter value indicative of the second operational parameter of the pump motor at the target time.

19 Claims, 6 Drawing Sheets

(51) Int. Cl.
*G01F 1/05* (2006.01)
*G06N 3/044* (2023.01)
*G06N 3/08* (2023.01)
*H02P 6/34* (2016.01)
*H02P 25/089* (2016.01)
*H02P 29/60* (2016.01)

(52) U.S. Cl.
CPC ............... *G06N 3/044* (2023.01); *G06N 3/08* (2013.01); *H02P 6/34* (2016.02); *H02P 25/089* (2016.02); *H02P 29/60* (2016.02); *F04B 2205/09* (2013.01)

(56) References Cited

U.S. PATENT DOCUMENTS

| | | |
|---|---|---|
| 2007/0212210 A1 | 9/2007 | Kernan et al. |
| 2008/0306892 A1 | 12/2008 | Crossley et al. |
| 2014/0135999 A1 | 5/2014 | Stavale |
| 2014/0199183 A1 | 7/2014 | Taravat et al. |
| 2016/0017889 A1* | 1/2016 | Cheng ................ F04D 15/0072 700/277 |
| 2017/0037857 A1 | 2/2017 | Sanders et al. |

* cited by examiner

METHOD FOR DETERMINING A FLUID FLOW RATE THROUGH A PUMP

TECHNICAL FIELD

The present disclosure relates to a method and apparatus for determining a fluid flow rate through a pump.

BACKGROUND

Pumps, in particular centrifugal pumps, are widely used in different technical areas, such as in water supply systems, waste water systems, in oil production systems and/or the like.

In many applications, it is desirable to know the flow rate through the pump. While it is possible to determine the flow rate by means of a flow sensor, this is often not a desirable solution, as flow sensors are relatively expensive.

US 2008/306892 discloses a method for determining a pump flow rate through an electrical submersible pump responsive to a pump discharge pressure measurement, a pump intake pressure measurement and a frequency of a motor associated with the electrical submersible pump. However, this prior art method still requires pressure measurements at the intake and at the discharge side of the pump. It would thus be desirable to provide a method for determining the flow rate through a pump that does not require any hydraulic measurements, such as pressure or flow measurements.

Moreover, modern pumps, in particular centrifugal pumps, are often carefully designed in order to increase pump efficiency and/or other pump performance parameters. For example, in the case of centrifugal pumps efforts are made to optimize the design of the pump impellers. It is thus desirable to provide a method for determining a flow rate through a pump that may be applied to a variety of pump designs.

It is further generally desirable to provide a method for determining a flow rate through a pump that is accurate, robust, fast and cost efficient.

SUMMARY

According to one aspect, disclosed herein are embodiments of a computer-implemented method for determining a flow rate of fluid flow at a target time through a pump, in particular a centrifugal pump, the pump being driven by a pump motor, the method comprising:
  receiving at least one set of previous parameter values including a first previous parameter value indicative of a first operational parameter at a previous time, earlier than the target time, and a second previous parameter value indicative of a second operational parameter at the previous time;
  receiving a current set of parameter values including a first current parameter value indicative of the first operational parameter at the target time and a second current parameter value indicative of the second operational parameter at the target time;
  computing the flow rate of fluid flow at the target time from the current set of parameter values and from the at least one set of previous parameter values.

The inventors have realized that the flow rate of fluid flow at the target time may be computed sufficiently accurately based on a current set and corresponding one or more previous sets of parameter values of at least a first and a second operational parameter. In particular, using both current and previous parameter values allows an accurate determination of the flow rate, even without the need for measuring any hydraulic parameters of the fluid flow, such as flow rate, pressure etc.

Moreover, the inventors have realized that the flow rate of fluid flow at the target time may be computed sufficiently accurately for a wide variety of pump designs, in particular also for pumps with optimized impeller design, by basing the computation of the flow rate not only on a current set of parameter values but also on one or more previous sets of parameter values.

In some embodiments, the method comprises receiving a plurality of sets of previous parameter values each set of previous parameter values being indicative of the first and second operational parameters at respective previous times, each previous time being earlier than the target time. The flow rate of fluid flow at the target time may be computed more accurately for a wide variety of pump designs, in particular also for pumps with optimized impeller design, by basing the computation of the flow rate not only on a current set of parameter values but also on a plurality of previous sets of parameter values.

The first and second operational parameters may be indicative of an operational state of the pump motor. In particular, each of the first and second operational parameters may be an operational parameter of the pump motor or a parameter derived from one or more operational parameters of the pump motor. In some embodiments, the computation of the fluid flow at the target time is based only on respective current and one or more previous sets of operational parameters of the pump motor and/or of operational parameters derived only from one or more operational parameters of the pump motor. In alternative embodiments, the computation of the fluid flow at the target time is based on one or more additional parameters in combination with the respective current and one or more previous sets of operational parameters of the pump motor and/or of operational parameters derived from one or more operational parameters of the pump motor.

Examples of operational parameters of the pump motor include a frequency or rotational speed of the pump motor, a power, in particular an electrical power, of the pump motor, an electrical current fed into the pump motor, etc.

Examples of a parameter derived from one or more operational parameters of the pump motor include a linear combination of multiple operational parameters, a polynomial of one or more operational parameters, a root of such a polynomial, an analytical estimate of a flow rate calculated from one or more operational parameters of the pump motor, etc.

Examples of additional parameters include a temperature of the motor electronics, a temperature of the pump motor, a temperature of the fluid pumped by the pump motor, etc. The inventors have found that predictions of the flow rate may be improved by also feeding temperature data into the model. Moreover, temperature data may be obtained by relatively inexpensive sensors.

In some embodiments, the first operational parameter is indicative of a frequency or rotational speed of the pump motor.

In some embodiments, the second operational parameter is indicative of a power, in particular an electrical power, of the pump motor. In an alternative embodiment, the second operational parameter is indicative of an electrical current fed into the pump motor.

The above operational parameters of a pump are typically easily obtained directly from a drive circuit of the pump motor or can otherwise readily be obtained without complicated modifications of the pump motor or drive circuit and without the need for expensive sensors, such as hydraulic sensors, such as pressure or flow sensors. In particular the combination of the rotational speed of the pump motor as first operational parameter and the electrical power or electrical current as a second parameter have been found suitable as inputs for the computation, in particular as the only input to the computation.

In some embodiments, the set of current parameter values and each set of previous parameter values include parameter values of a third operational parameter and, optionally, of even further operational parameters of the pump motor. In some embodiments, the use of additional operational parameters as a basis for the computation of the flow rate has been found to provide a more accurate result. In particular, in some embodiments, in addition to a parameter value indicative of the first operational parameter, e.g. of the rotational speed of the pump motor, the set of current parameter values and each set of previous parameter values include parameter values of the power of the pump motor and of the electrical current fed into the pump motor. The inventors have realized that, at least in some situations, the use of the power and the current as separate input values provides a more accurate estimate of the flow rate.

The current parameter values do not necessarily need to be measured or otherwise obtained at exactly the target time, or even exactly at the same time, as long as they are sufficiently representative of the respective parameter values at the target time. Similarly, the parameter values indicative of operational parameters at a certain previous time do not necessarily need to be measured or otherwise obtained at exactly the previous time, or even at exactly the same time, as long as they are sufficiently representative of the respective parameter values at the previous time. The acceptable deviations in measurement times will depend on the typical rate at which the respective parameter values change over time. For example, the different operational parameters may be sampled at slightly different sampling rates or, even if sampled at the same rate, they may be sampled at a time offset relative to each other. The target time may often but not necessarily be the current time, i.e. the time at which the flow rate is determined.

The computing of the flow rate of fluid flow at the target time may be based on a suitable computational model that relates the current and previous parameter values of the respective operational parameters with the flow rate at the target time. To this end, the computational model may take the previous parameter values into account in a variety of ways. In some embodiments, the computational model includes a dynamic model that maintains an internal state. In particular, a previous internal state—i.e. a previously calculated internal state—may depend on the one or more sets of previous parameter values. The computation of the flow rate may be based on the current set of parameter values and on the previous internal state. A current internal state may thus depend on the previous internal state and on the current set of parameter values.

The computational model may be implemented by a computer program when the computer program is executed by a processing unit, or it may be implemented by an otherwise suitably configured processing unit. In particular, a processing unit implementing the computational model may receive a sequence of inputs, each input representing one or more sets of parameter values. The processing unit may, for a current input, compute a current flow rate from the current input and from a previous internal state of the model and compute a current internal state of the model from the current input and from the previous internal state. The processing unit may maintain the current internal state for use in a subsequent step for computing a subsequent flow rate and a subsequent internal state from a subsequent input and from the current internal state. The input may represent the current parameter set and, optionally, one or more previous parameter sets, i.e. the model may receive a sliding window of the current parameter set and one or more previous parameter sets.

The processing unit implementing the computational model may be adapted to identify one of a plurality—such as one of two—solutions of a non-unique mapping between a current set of parameter values and the flow rate, i.e. a mapping that maps a current set of parameter values to two or more possible flow rates. In particular, the processing unit implementing the computational model may be configured to use previous values of the operational parameters to select one of the plurality of possible solutions or to calculate a final estimate based on the plurality of possible solutions. In some embodiments, the process may include calculating the plurality of solutions, e.g. two solutions, of an analytical model that relates a set of parameter values with the flow rate, i.e. each solution of the analytical model represents a possible estimate of the flow rate. The computational model, in particular a machine-learning portion of the model, may thus receive a current solution and, optionally, one or more previous solutions. The current solutions may be calculated from the current set of parameters and the previous solutions may be calculated from respective previous sets of parameters. The calculated plurality of solutions may then be used by the computational model as inputs instead of or in addition to the other operational parameters of the pump motor.

The computational model may include a machine learning model, such as a neural network model. In particular the computational model may include a recurrent neural network model, such as an LSTM network or GRU network. A recurrent neural network (RNN) is a class of artificial neural network where connections between nodes form a directed graph along a temporal sequence. This allows it to exhibit temporal dynamic behavior. Unlike feedforward neural networks, RNNs can use their internal state (memory) to process sequences of inputs. This makes them applicable to tasks such as unsegmented, connected handwriting recognition or speech recognition.

The neural network model may include a recurrent portion and one or more feed-forward portions, such as an initial feed-forward portion followed by a recurrent portion. The initial feed-forward portion may include one or more convolutional network layers.

It is noted that features of the various embodiments of a computer-implemented method described above and in the following may be implemented at least in part in software or firmware and carried out on a data processing system or other processing unit caused by the execution of program code means such as computer-executable instructions. Here and in the following, the term processing unit comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), special purpose electronic circuits, etc., or a combination thereof.

The present disclosure relates to different aspects, including the method described above and in the following, further methods, systems, devices and product means, each yielding one or more of the benefits and advantages described in connection with one or more of the other aspects, and each having one or more embodiments corresponding to the embodiments described in connection with one or more of the other aspects described herein and/or as disclosed in the appended claims.

In particular, another aspect disclosed herein relates to embodiments of a data processing system configured to perform the acts of the method described herein. To this end, the data processing system may have stored thereon program code configured, when executed by the data processing system, to cause the data processing system to perform the acts of the method described herein. In some embodiments, the data processing system may include a processing unit of a pump assembly and/or one or more data processing apparatus external to the pump assembly.

The processing unit of a pump assembly may be integrated into a drive circuit of the pump assembly, e.g. into a drive circuit controlling the pump motor. Accordingly, the drive circuit of the pump assembly may be suitably programmed to perform an embodiment of the process described herein, either alone as a stand-alone device or as part of a distributed data processing system, e.g. as a client terminal of a client-server system or as a client terminal of a cloud-based architecture. The processing unit may include a memory for storing previous parameter values and/or for storing an internal state of a computational model, the internal state being computed by the processing unit based on one or more sets of previous parameter values.

Accordingly, another aspect disclosed herein relates to a pump system comprising a pump assembly and a data processing system configured to perform the acts of an embodiment of the method described herein. The pump assembly may comprise a pump and a pump motor configured to drive the pump. The pump assembly may further comprise a drive circuit controlling the pump motor. The data processing system may be a data processing system separate from the pump assembly, in particular a data processing system communicatively coupled to the pump assembly. Alternatively, a part of the data processing system or the whole data processing system may be integrated into the pump assembly, e.g. accommodated in a housing of the pump assembly. In particular at least a part of the data processing system may be embodied as a processing unit of the pump assembly, e.g. a processing unit integrated into the drive circuit of the pump assembly or embodied as a separate processing unit.

Yet another aspect disclosed herein relates to embodiments of a computer program configured to cause a data processing system to perform the acts of the computer-implemented method described above and in the following. A computer program may comprise program code means adapted to cause a data processing system to perform the acts of the computer-implemented method disclosed above and in the following when the program code means are executed on the data processing system. The computer program may be stored on a computer-readable storage medium, in particular a non-transient storage medium, or embodied as a data signal. The non-transient storage medium may comprise any suitable circuitry or device for storing data, such as a RAM, a ROM, an EPROM, EEPROM, flash memory, magnetic or optical storage device, such as a CD ROM, a DVD, a hard disk, and/or the like.

BRIEF DESCRIPTION OF THE DRAWINGS

The above and other aspects will be apparent and elucidated from the embodiments described in the following with reference to the drawing in which.

DETAILED DESCRIPTION

Figure 1:
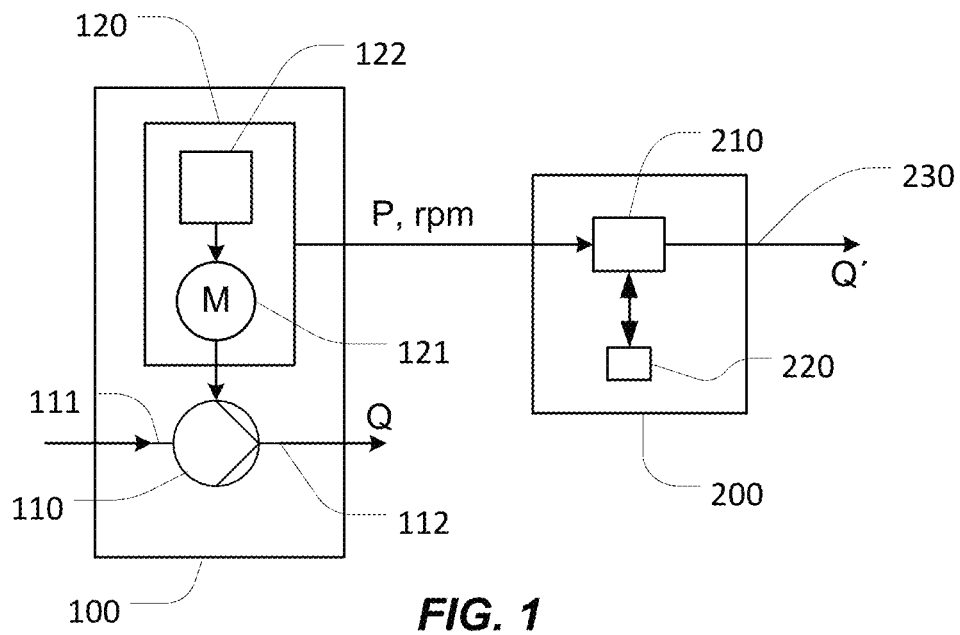
FIG. 1 schematically illustrates an embodiment of a pump system.

FIG. 1 schematically illustrates an embodiment of a pump system. The pump system comprises a pump assembly 100 and a data processing system 200.

The pump assembly comprises a pump 110 and a pump drive 120. The pump 110 may be a centrifugal pump or a different type of pump. The pump 110 has an inlet 111 for suction of water or a different fluid, such as of a different liquid. The pump 110 also has an outlet 112 for providing the output flow of the pump. The pump drive 120 comprises a motor 121, such as an electrical motor, and a motor drive circuit 122. The motor drive circuit may include a frequency converter for supplying the motor with electrical energy and/or other circuitry for controlling operation of the motor 121. The motor drive circuit may be connectable to a suitable power supply (not shown) in order to supply the drive circuit, e.g. a frequency converter, with electric energy. During operation, the motor 121 drives the pump causing the pump to pump fluid from the inlet 111 to the outlet 112 at a flow rate Q.

The data processing system 200 may be a suitably programmed computer or other data processing device; alternatively the data processing system may be a distributed system including more than one computer. For example, the data processing system may be a suitably programmed tablet computer, smartphone or the like. Other examples of a data processing system may include a control system configured to control one or more pump assemblies. The data processing system is communicatively coupled to the pump assembly 100, e.g. via a wired or wireless connection. In particular, the data processing system 200 may be communicatively coupled to the pump drive 120, such as to the motor drive circuit 122. The communication between the pump assembly and the data processing system may be a direct communication link or an indirect link, e.g. via one or more nodes of a communications network. Examples of a wired connection include a local area network, a serial communications link, etc. Examples of wireless connections include radio frequency communications link, e.g. Wifi, Bluetooth, cellular communication, etc.

The data processing system 200 comprises a suitably programmed processing unit 210 and a memory 220. The memory has stored thereon a computer program and/or data for use by the processor.

During operation, the data processing system 200 receives parameter values from the pump assembly 100. The received parameter values are indicative of a first operational parameter of the pump motor and of a second operational parameter of the pump motor. In particular, the first operational parameter may be indicative of a frequency or a rotational speed (rpm) of the pump motor. The second operational parameter may be indicative of a power (P), in particular an electrical power, of the pump motor or of an electrical current (i) fed into the pump motor. In some embodiments, the data processing system may receive parameter values of one or more additional or alternative operational parameters of the pump motor and/or other sensor data, e.g. temperature data.

The data processing system 200 may receive the parameter values intermittently, e.g. periodically, e.g. such that the data processing system receives first and second time series of parameter values indicative of the first and second parameter, respectively, at different points in time. The pump assembly may transmit the parameter values automatically or upon request of the data processing system. Each parameter values may be associated with a time stamp.

The processing unit 210 computes a computed flow rate Q' of fluid flow through the pump 110 based on the received parameter values. In particular, the processing unit is configured to compute the flow rate at a target time, e.g. a current flow rate, based on the received parameter values indicative of the first and second parameters at the target time and from received parameter values indicative of the first and second parameters at one or more earlier times, earlier than the target time. Typically, the parameter values indicative of the first and second parameters at one or more earlier times are parameter values which the data processing system has received from the pump assembly at one or more earlier times, earlier than a time of receipt of the parameter values indicative of the first and second parameters at the target time. To this end, the processing unit stores the received parameter values in memory 220 and/or the processing unit stores an internal state of a computational model in memory where the internal state depends on the parameter values indicative of the first and second parameters at the one or more earlier times. The data processing system 200 comprises an output interface 230, e.g. a display or other user-interface and/or a data communications interface, an interface to a data storage device, and/or the like. The data processing system may thus be configured to output the computed flow rate Q' via the output interface 230.

An example of a computational model for computing the flow rate will be described in more detail below.

Figure 2:
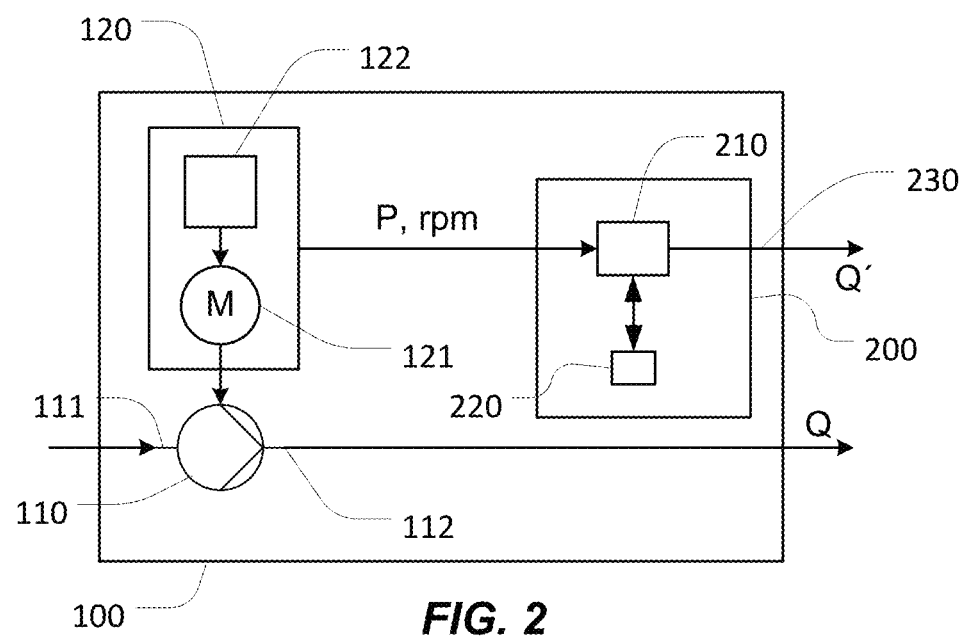
FIG. 2 schematically illustrates another embodiment of a pump system.

FIG. 2 schematically illustrates a pump system comprising a pump assembly 100 that has a data processing system in the form of a data processing unit 200 integrated into the pump assembly. The pump assembly further includes a pump 110 and a pump drive 120 as described in connection with FIG. 1. The data processing unit 200 may be as described in connection with the data processing system of FIG. 1 except that, in this embodiment, the data processing unit 200 is integrated into the pump assembly, e.g. accommodated into the same housing as the pump drive 120. Accordingly, the data processing unit 200 receives the parameter values of the first and second operational parameters from the drive unit via an internal interface, e.g. a data bus or another suitable wired or wireless interface.

Figure 3:
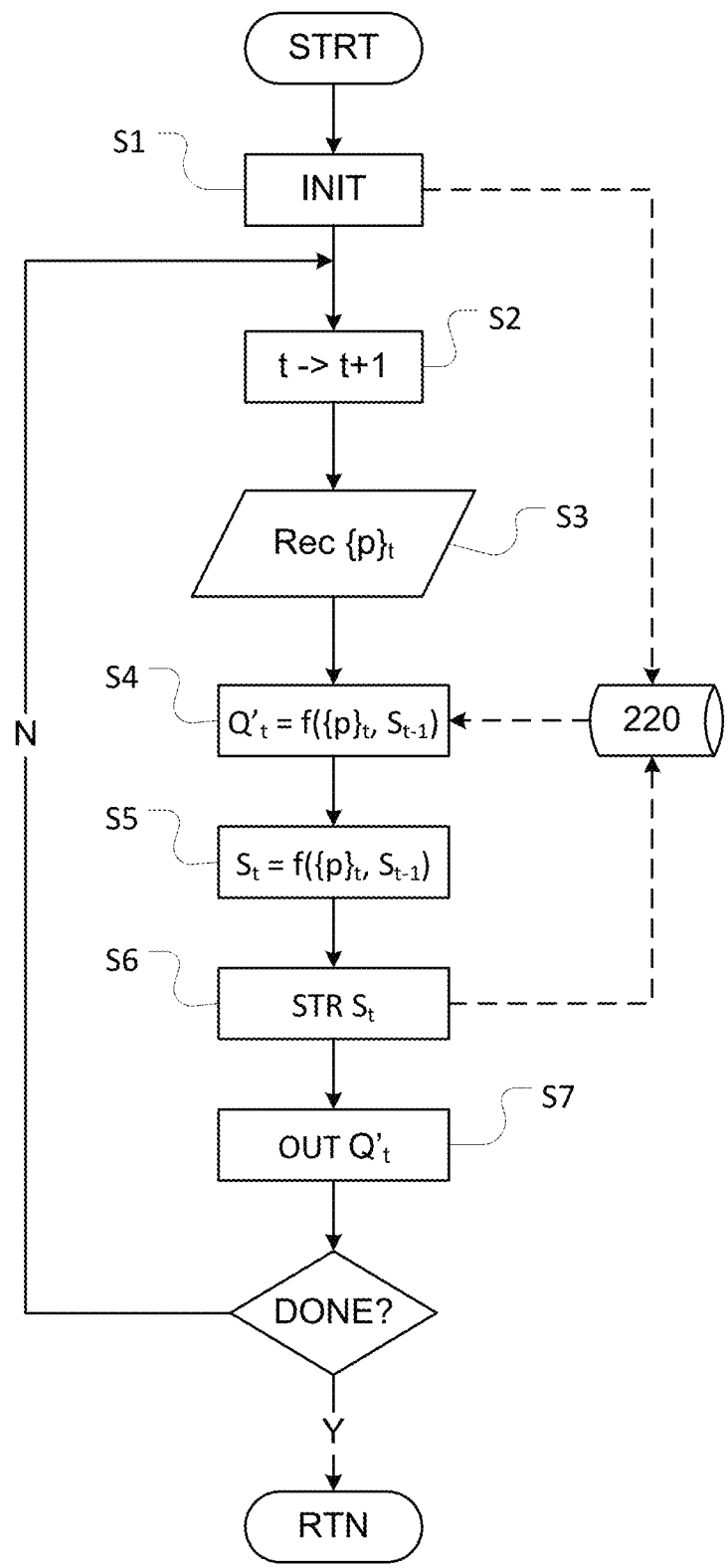
FIG. 3 schematically illustrates a process of determining a flow rate of fluid flow at a target time through a pump.

FIG. 3 schematically illustrates a process of determining a flow rate of fluid flow at a target time through a pump. The process may e.g. be performed by the data processing system 200 of FIG. 1 or the data processing unit 200 of FIG. 2.

At step S1, the process is initialised. In particular the process initialises an internal state of a computational model. It will be appreciated that the internal state of the model may be defined by a single value of a single model parameter or by multiple values of respective model parameters. The internal state may e.g. be initialised to one or more predetermined initial values. The process stores the internal state in a memory, e.g. in a RAM associated with the processing unit executing the process. The process also initialises a time to an initial time, e.g. time t=0.

At step S2, the time is incremented. It will be appreciated that the time may be incremented by a fixed or by a variable interval. In some embodiments the time may be incremented based on a time of receipt of current parameter values or based on a time stamp received from the pump drive associated with received parameter values, i.e. in some embodiments, incrementing the time may be performed as part of subsequent step S3. For the purpose of the present description, for simplicity of presentation, the time parameter t will be considered as an index, i.e. incrementing the time will be represented as t->t+1.

At step S3, the process receives a set of current parameter values $\{p\}_t$ from a pump drive. The received current parameter values represent the parameter values at the current time. The set includes a first parameter $p_1$ and a second operational parameter $p_2$. The first parameter may represent a frequency or rotational speed (rpm) of the pump motor and the second parameter may represent a power P of the pump motor. Accordingly, in one embodiment, $p_1$=rpm and $p_2$=P. In another embodiment the second operational parameter is the electric current I fed into the pump motor, i.e. $p_1$=rpm and $p_2$=I. In yet another embodiment, the process receives three parameters, e.g. $p_1$=rpm, $p_2$=P and $p_3$=I. It will be appreciated that other embodiments of the process may receive additional or alternative parameters, in particular additional or alternative operational parameters of the pump motor and/or other sensor data. As mentioned above, in some embodiments the process receives the current time t as an additional parameter.

At step S4, the process computes an estimated flow rate $Q'_t$ from the received current parameter values and from the stored internal state of the computational model that is retrieved from memory. As will be apparent from the description below, during an initial iteration, the stored internal state may be the state determined during the initialisation step. In subsequent iterations, the stored internal state is the state that was computed during a previous iteration of the process, i.e. in respect of a previous time, in particular in respect of time t−1. The internal state of the model retrieved from memory will thus be designated as $S_{t-1}$. The computation may thus be represented as $$Q'_t = f(\{p\}_t, S_{t-1}),$$

i.e. $Q'_t$ is computed as a function f of $\{p\}_t$ and $S_{t-1}$.

At step S5, the process computes an updated internal state $S_t$ (also referred to as the current internal state) of the computational model from the previous internal state $S_{t-1}$ retrieved from memory and from the received current parameter values:

$$S_t = g(\{p\}_t, S_{t-1}),$$

i.e. $S_t$ is computed as a function g of $\{p\}_t$ and $S_{t-1}$.

At step S6, the process stores the current internal state $S_t$ in the memory for use in a subsequent iteration of the process. It will be appreciated that step S5 may be performed as an integral part of step S4.

At step S7, the process outputs the computed estimated flow rate $Q'_t$. The computed flow rate thus represents the flow rate at the current time. For example, the process may display the computed estimated flow rate or a value derived therefrom, e.g. an averaged estimated flow rate, such as an averaged flow rate averaged over a number of time steps, or a relative flow rate relative to a nominal flow rate or a desired flow rate. Alternatively or additionally, the process may output the computed estimated flow rate in a different manner, e.g. communicate the flow rate to another process or device, log or otherwise store the computed estimated flow rate, and/or the like.

Unless the process is terminated, the process returns to step S2 where the time is incremented, and where a new set of current parameter values is received and processed. During the subsequent iteration of the process, the internal state used for the computation of the flow rate is the internal state computed in the previous iteration, i.e. the internal state is based on one or more previously received sets of parameter values. In particular, when the new internal state depends on a current set of parameter values and on the current internal state, the internal state maintains information about a plurality of previous parameter values.

In some embodiments, alternative or in addition to the dependence of the estimated flow rate on the internal state of the computational model, the computation of the estimated flow rate may explicitly depend on previously received parameter values, e.g.

$$Q'_t = h(\{p\}_t, \{p\}_{t-1}, \ldots, \{p\}_{t-K}) \text{ or } Q'_t = h(\{p\}_t, S_{t-1}, \{p\}_{t-1} \ldots, \{p\}_{t-K})$$

i.e. $Q'_t$ is computed as a function h of at least the current parameter values $\{p\}_t$ and of K (K>0) previous sets of parameter values $\{p\}_{t-1}, \ldots, \{p\}_{t-K}$.

Figure 4:
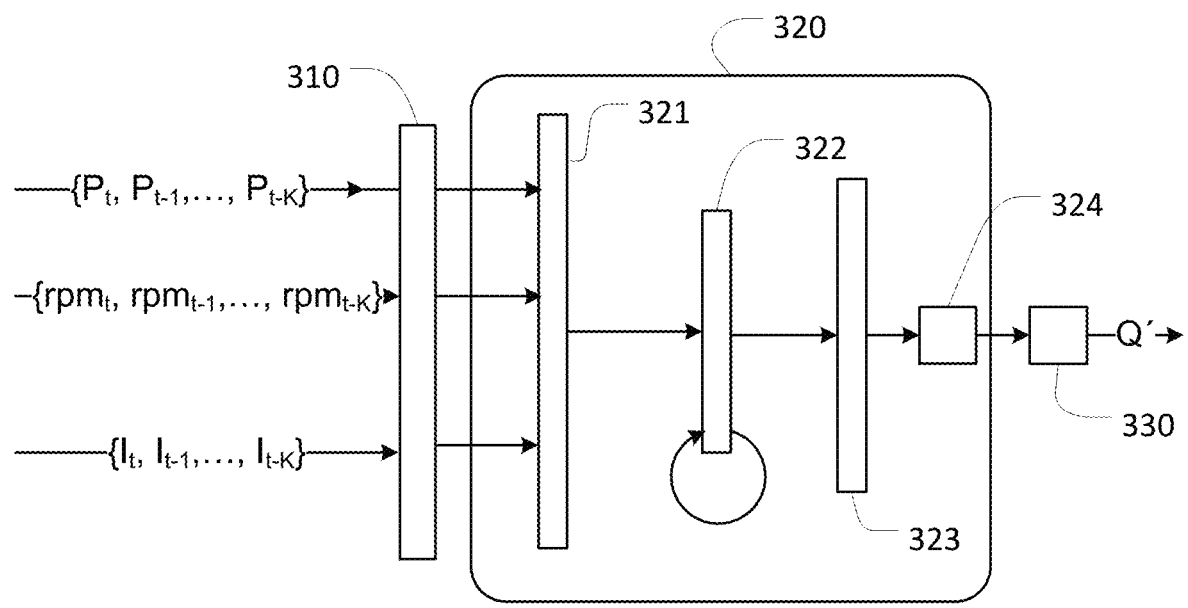
FIG. 4 schematically illustrates an embodiment of a computational model for computing an estimated flow rate.

FIG. 4 schematically illustrates an embodiment of a computational model for computing an estimated flow rate. The model may be implemented by the data processing system 200 of FIG. 1 or by the data processing unit 200 of FIG. 2 and/or used by the process of FIG. 3.

The computational model receives respective time series of the power of the pump motor, the rotational speed of the pump motor and of the electrical current driving the pump motor. It will be appreciated that, in other embodiments, the model may receive alternative and/or additional parameters. In some embodiments, the model may receive the time steps as an explicit additional input series.

The model input is input to an optional pre-processing stage 310. The pre-processing stage may perform one or more pre-processing steps, such as scaling of the respective parameters.

In some embodiments, the pre-processing step may compute processed parameters, e.g. combinations from the received parameters. Examples of such combination include a linear combination of two or more parameters, a polynomial of one or more of the received parameters, one or more roots of such a polynomial, a plurality of possible solutions of an analytical model and/or the like.

The pre-processed time series are fed into a multilayer neural network model 320.

In particular, the neural network model 320 comprises an initial 1-dimensional convolutional layer 321. For each time series, the convolutional layer computes a convolution of the input with a convolution kernel. The 1d convolutional layer may receive a suitable number of time steps, e.g. between 10 and 100 time steps. The output of the convolutional layer may be considered as filtered values that are down-sampled relative to the input time series which may result in a reduced calculation time in the subsequent recurrent layers.

The 1d convolutional layer as an initial layer has been found useful, because the data is down sampled, which speeds up the training of the subsequent recurrent layers (LSTM/GRU). Moreover, it is believed that the convolution may help to reduce the sensitivity of the model to the size of the time steps, which may be varying during operation.

The output of the convolutional layer 321 is fed into a recurrent layer 322, e.g. a GRU layer or an LSTM layer. The recurrent layer includes a plurality of recurrent nodes that each computes an output which depends on the input to the recurrent node and on an internal state which is also updated.

The output of the recurrent layer 322 is fed into a fully connected hidden layer 323 which comprises a plurality of hidden nodes. Each hidden node receives as inputs the outputs of some or all recurrent nodes of the preceding recurrent layer 322, weighted by respective weights, and outputs an activation function of a sum of the weighted inputs.

The model further comprises an output node 324 which receives the outputs of all hidden nodes of hidden layer 323, weighted by respective weights, and outputs an activation function of a sum of the weighted inputs. The output of the output node represents the flow rate. The output of the output node 324 may be fed through a post-processing block 330 which may e.g. perform a suitable scaling and/or other post-processing steps and output the final estimated flow rate Q'.

It will be appreciated that alternative embodiments may employ other computational models, such as neural networks with other model architectures. For example, in some embodiments, the initial convolutional layer may be omitted and the time series may be input directly into a recurrent layer. Other embodiments may include more than one convolutional layer where the output of the initial convolutional layer is fed into a subsequent convolutional layer. The recurrent layer may thus receive the output of a final convolutional layer of a series of two or more convolutional layers. Alternatively or additionally, some embodiments of a neural network model may include more than one recurrent layer such that the recurrent nodes of a subsequent recurrent layer receive the outputs of some or all of the recurrent nodes of a previous recurrent layer. It will further be appreciated that other combinations or successions of different types of layers may be used. Similarly, the various layers may include different numbers of nodes (also referred to as "neurons"). The nodes of successive layers may be fully connected or partially connected by respective weights to the nodes of the preceding layers.

Figure 5:
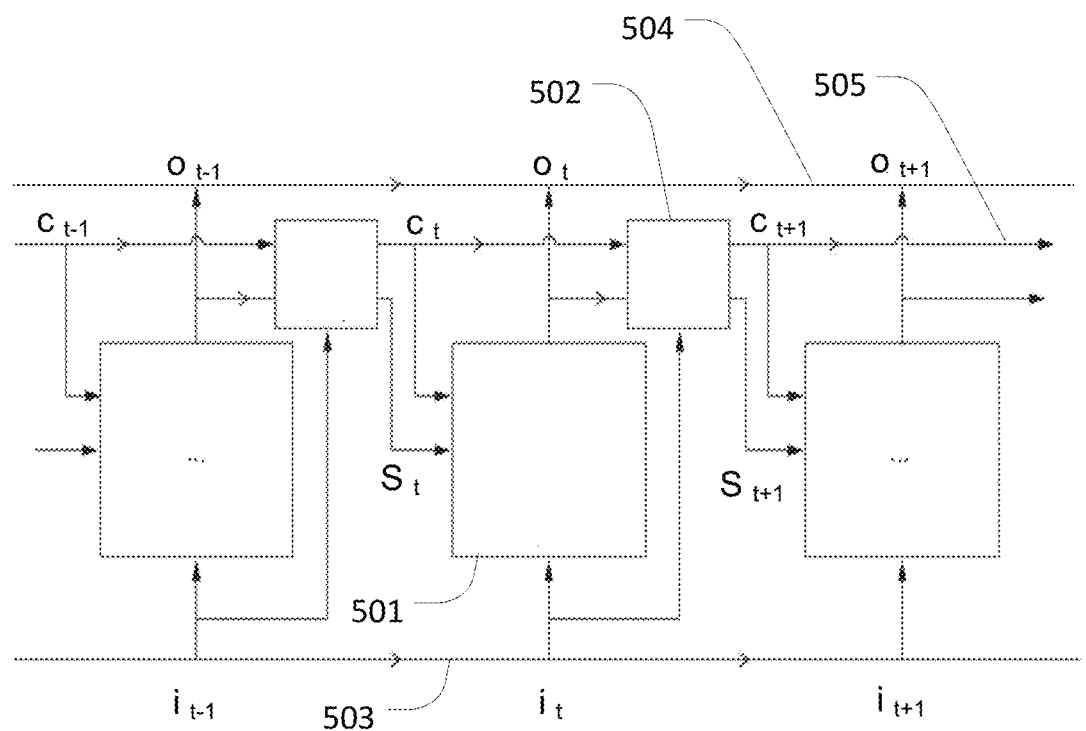
FIG. 5 schematically shows a more detailed illustration of the operation of an example of a recurrent node of a neural network model for computing an estimated flow rate.

FIG. 5 schematically shows a more detailed illustration of the operation of an example of a recurrent node of a neural network model for computing an estimated flow rate, e.g. of the model of FIG. 4.

Typically, a layer of a recurrent neural network model comprises a plurality of nodes that each operate in a parallel fashion. At each time step, each node receives an input and computes an output. The node also updates an internal state of the node for use in a subsequent time step.

FIG. 5 illustrates operation of one such node 501. At each time step, node 501 receives an input 503 and computes a corresponding output 504. In addition, the recurrent layer comprises an internal state 502 that is updated at each time step. The example of FIG. 5 represents an LSTM node. However, it will be appreciated that other embodiments may implement GRU nodes or other types of recurrent nodes.

At time step t, the node 501 receives an input $i_t$. The input $i_t$ may be
- one of the operational parameters of the motor, e.g. the motor power $P_t$, the motor current $I_t$, the motor speed $rpm_t$ or the like, or a parameter derived from, or otherwise associated with the operational state of the motor.
- a vector representing multiple operational parameters—for example, the network may comprise an input layer comprising one input node for each operational parameter—, or
- the output of a previous layer, e.g. a vector of the outputs of respective nodes of a previous layer of the neural network model, e.g. of a convolutional layer or of a previous recurrent layer.

At time step t, the node 501 computes an output $o_t$. The output $o_t$ is fed as an input to a subsequent layer or to an output node of the neural network model. Accordingly, the output node or the subsequent layer may receive a vector of the outputs of the nodes of the layer to which node 501 belongs.

In particular, the node 501 computes the output $o_t$ as $$o_t = \alpha(W_o \cdot i_t + U_o \cdot S_t + V_o \cdot c_t + b_o)$$

Here $\alpha$ is an activation function, e.g. a sigmoidal function, e.g. a tanh or the like. $W_o$ is a weight matrix which is determined during training of the neural network. $S_t$ and $c_t$ represent the internal state of the node 501 at time t and $U_o$, $V_o$ and $b_o$ are sets of weight parameters that are determined during training of the network.

The values $S_t$ and $c_t$ are retrieved from internal memory, e.g. memory 220 of FIGS. 1-3, where they have been stored during a preceding time step. At time step t, the model updates the values of $S_t$ and $c_t$ for use in the subsequent time step t+1. A more detailed description of an example of a LSTM neural network may be found in Hochreiter, Sepp & Schmidhuber, Jürgen. (1997). Long Short-term Memory. Neural computation. 9. 1735-80.10.1162/neco.1997.9.8.1735.

Figure 6:
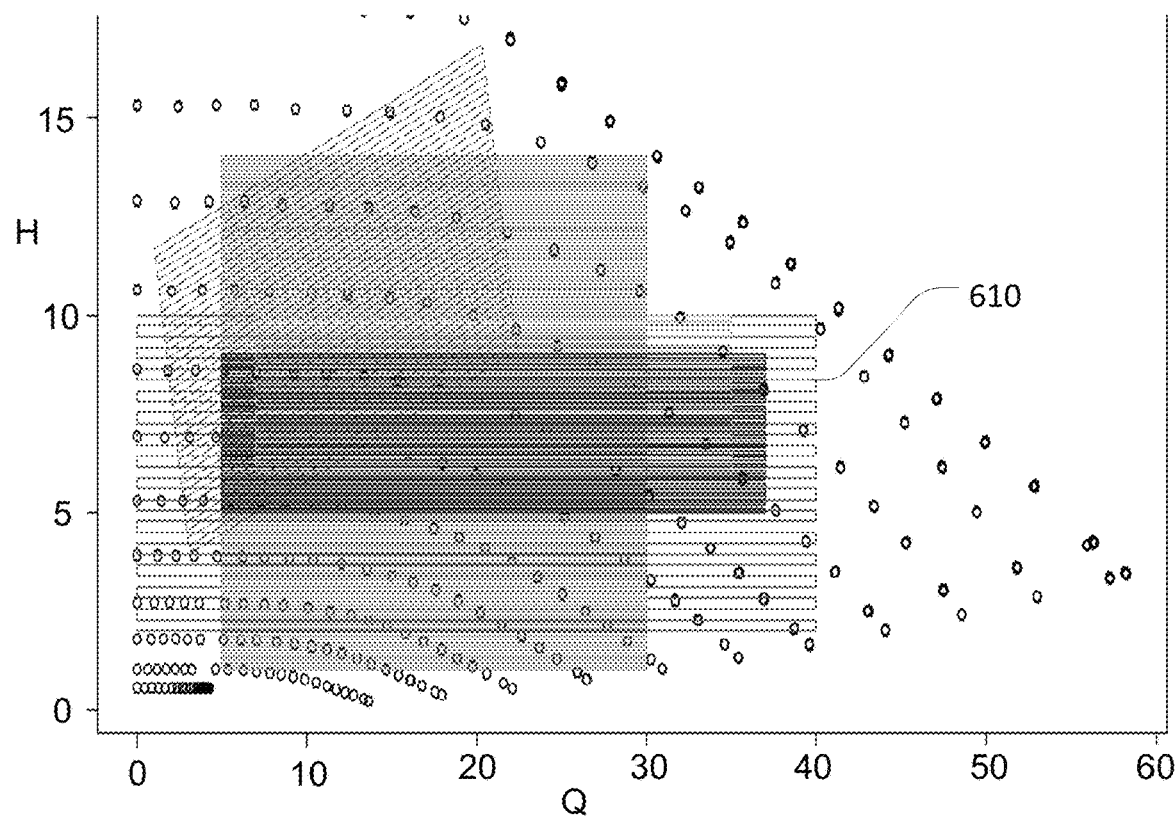
FIG. 6 illustrates an example of a training set including paths through a parameter space.

The network may be trained by a suitable supervised training method. To this end, a training set may be constructed such that each example of the training set represents a path, i.e. a sequence of points, in a suitable parameter space. If the network, during operation, is to receive the motor speed (rpm) and motor power (P) and to output the flow rate Q through the pump, the training examples may be chosen as a sequence of points in a (rpm, P, Q) space. If alternative or additional input parameters are used, a corresponding parameter space may be used. The training examples may be generated by operating a physical pump at different rpm and P and by measuring the corresponding flow rates Q. Alternatively or additionally, training examples may be synthetically created based on computational models describing the pump performance. FIG. 6 illustrates an example of a training set including N paths through the parameter space. In particular, FIG. 6 illustrates the paths in a 2D representation of the parameter space namely in an HQ diagram. The paths may be considered as parameterized by time or a pseudo-time. The training examples thus comprise sequences of points along the respective paths. The distance between points may vary between the training examples.

Figure 7:
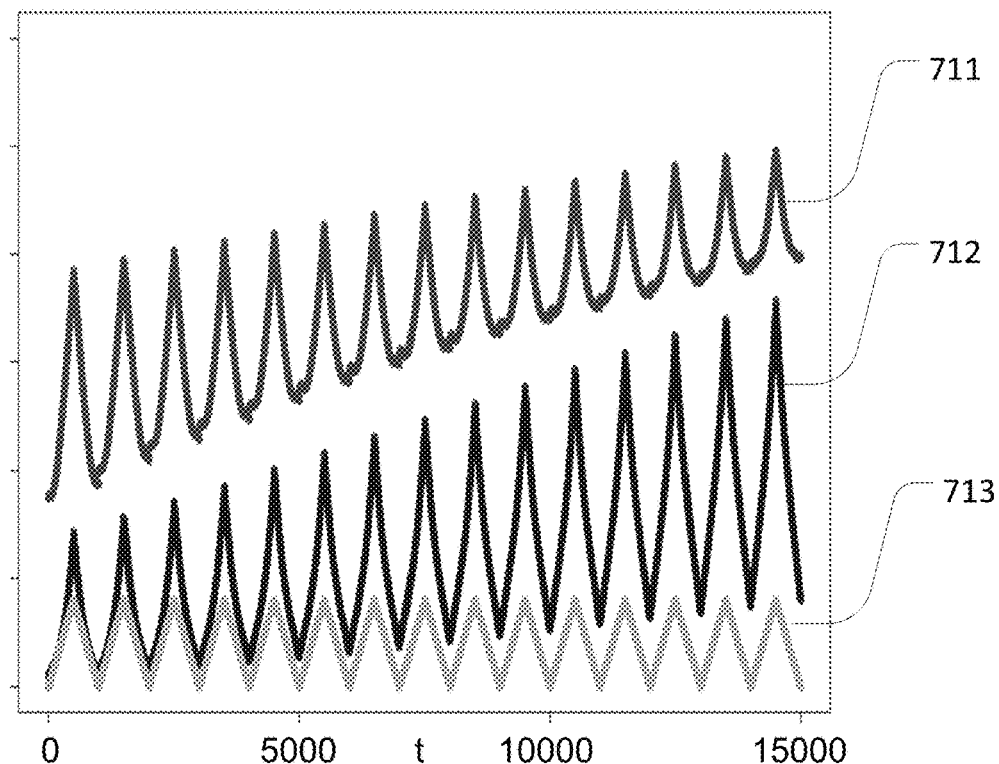
FIG. 7 illustrates the power, rotational speed and flow rate along one of the paths in the training set of FIG. 6.

FIG. 7 illustrates the power, rotational speed and flow rate along one of the paths in the training set illustrated in FIG. 6, namely along path 610.

Figure 11:
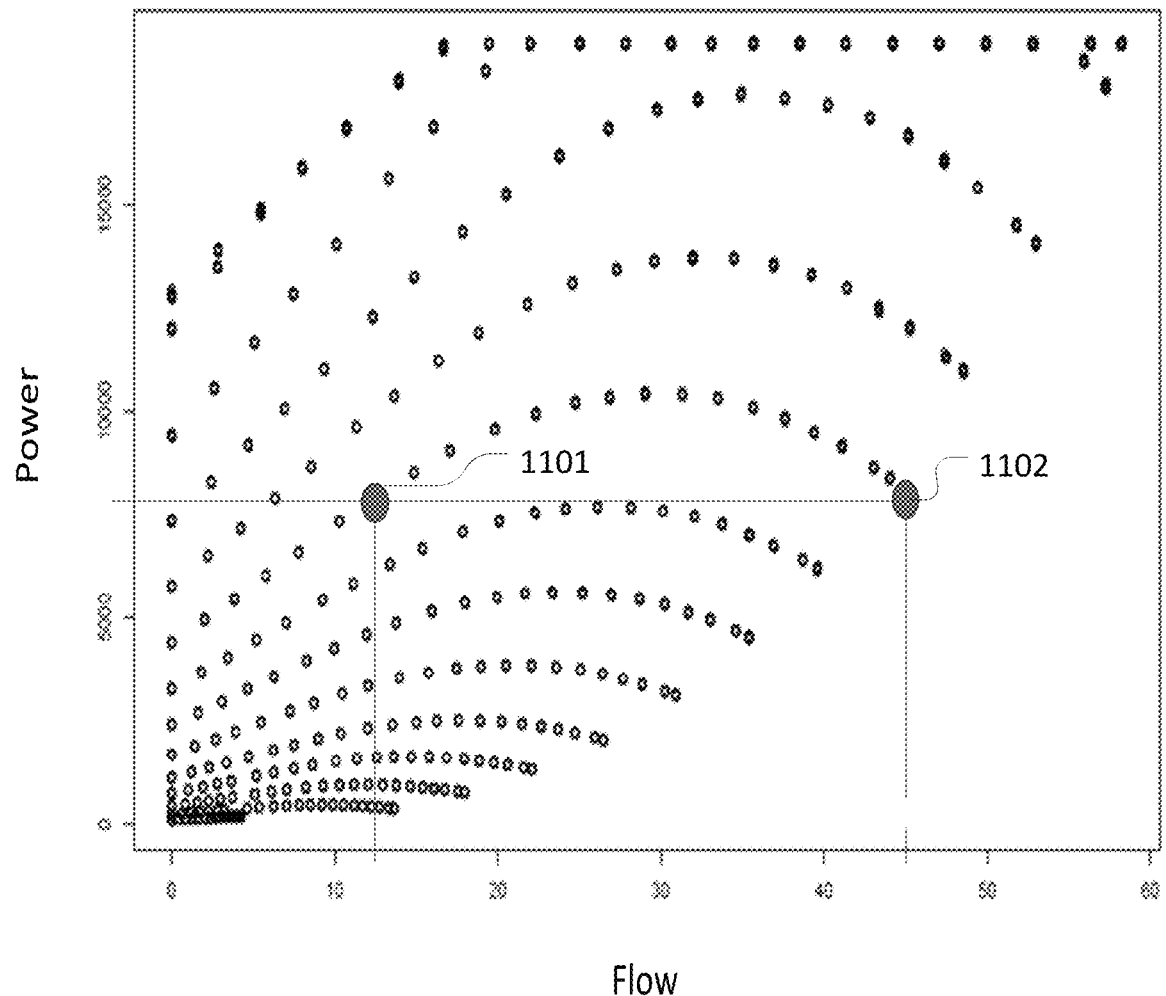
FIG. 11 illustrates results of an analytical model that associates the motor power P and the flow rate Q for different values of the motor speed measured in rpm for an example of a modern centrifugal pump.

It is important to note that, while numerical models of the pump operation may be used to create training examples, these models do not always allow the flow rate Q to be estimated from the other operational parameters of the pump motor (e.g. from the rotational speed and power). In particular, the same sets of operational parameters (e.g. the same rpm and P values) may map onto different flow rates. This is illustrated in FIG. 11, which shows relations between the power P and the flow rate Q for an example of a modern centrifugal pump with optimized impellers. As can be seen, for a given rpm, and a given value of P, two solutions for the flow rate Q are possible.

The inventors have realized that using a computational model that employs a time history of input parameters for predicting the flow rate provides an accurate flow rate prediction. In particular, use of a suitably trained recurrent neural network has been found to provide accurate predictions of the flow rate.

During training of the network model, e.g. the model described with reference to FIGS. 4 and 5, the rpm time series 711 and the power time series 712 are fed as inputs into the computational model and the model is trained to output the flow rate time series 713. In particular, the weights of the model (e.g. the weights of the recurrent model illustrated in FIG. 5 and, optionally the weights of initial convolutional layer and/or an output layer e.g. as illustrated in FIG. 4) may be trained using a back-propagation algorithm or another suitable training algorithm.

The prediction quality of a trained machine learning model may be validated based on suitable validation examples, i.e. based on examples of paths through the chosen parameter space for which the actual flow rates are known but which have not been used for the training of the model.

Figure 8:
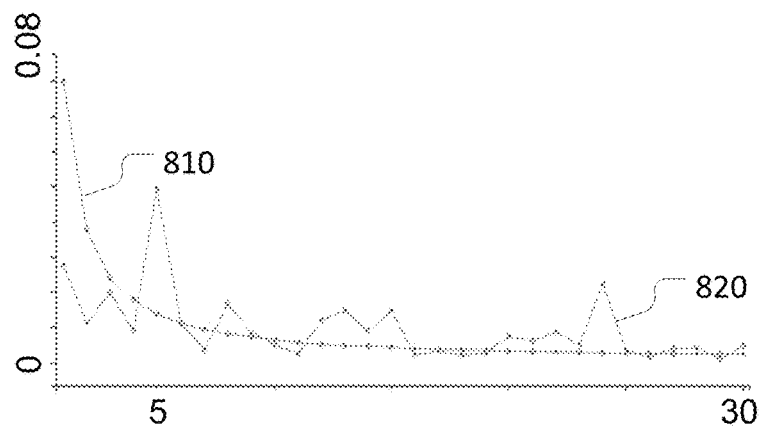
FIG. 8 shows a training error and a validation error as a function of the number of training epochs of a training algorithm according to one embodiment of a process described herein.

FIG. 8 shows the evolution of the error during the training of a neural network model as described in connection with FIGS. 4 and 5. The training was based on a training set as described in connection with FIGS. 6 and 7. In particular, FIG. 8 shows the training error 810, i.e. the mean square error over the training examples, and the validation error 820, i.e. the mean square error over a set of validation examples which were not used during training. The training and validation errors are shown as a function of the number of training epochs of the training algorithm.

Figure 9:
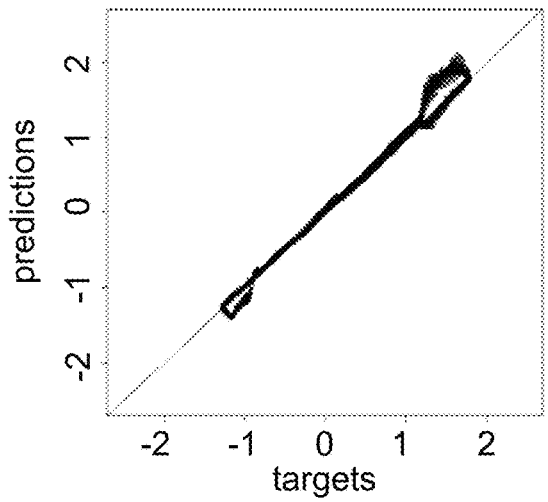
FIG. 9 shows an example of prediction results on an evaluation example of a trained machine learning model.

FIG. 9 shows an example of the prediction results on an evaluation example of the trained model, i.e. of a network as described in connection with FIGS. 4 and 5 trained using a training set as described in connection with FIGS. 6 and 7. In particular, FIG. 9 illustrates the predicted flow rates vs. the actual flow rates for the evaluation example.

Figure 10:
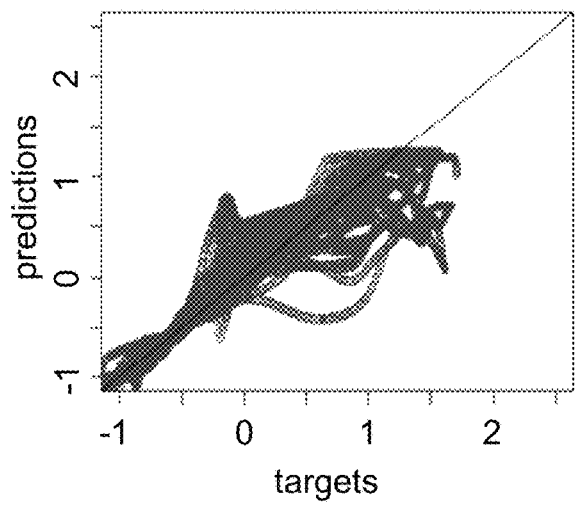
FIG. 10 shows a comparative result of the validation error of a trained feed-forward neural network.

FIG. 10 shows a comparative result where a conventional feed-forward neural network has been trained, i.e. a model that does not take the time dimension into account and that has no internal memory for maintaining internal states of the model over time. The feed-forward network has been trained on the same training set as the recurrent neural network. As can be seen from a comparison of FIGS. 9 and 10, the use of a time-dependent/recurrent model considerably improves the prediction results.

FIG. 11 illustrates results of an analytical model that associates the motor power P and the flow rate Q for different values of the motor speed measured in rpm for an example of a modern centrifugal pump. In particular, FIG. 11 shows the power P as a function of flow rate Q for different values of rpm, in particular FIG. 11 shows the power P as a function of Q along lines of constant rpm. As can be seen from this example, for a given motor speed and a given power P, the model does not always provide a unique solution for the flow rate Q. An example of a pair of possible solutions for given values of P and rpm are illustrated by dots 1101 and 1102. In particular, the model may provide the solution for the flow rate Q as a root of a polynomial, e.g. a polynomial in P and rpm. However, the polynomial may have multiple roots, thus resulting in multiple possible solutions.

In some embodiments of the process described herein, the process may, e.g. for each time step, determine the possible solutions of an analytical model and feed the possible solutions as additional parameters into the dynamic computational model. For example, the possible solutions may be calculated in an initial stage of the model and fed into a subsequent machine learning portion of the model, e.g. into the neural network model 320 described above with reference to FIG. 4.

For instance, when the process receives a new set of parameters, e.g. (Pn, In, Sn), where Pn, In and Sn are the received power, current and speed value at time step n, respectively, the model may evaluate a polynomial Pn as $Pn=a1*Q^3+a2*In^3+a3*Sn^3+a4*Q^2*In+$other terms in Pn, In, Sn and/or Q with a corresponding set of constants (a1, a2, a3, etc.). The constants may be found using known performance data of the motor. These constants can be said to represent a compressed version of the performance data set of the given pump, which may thus be regarded as additional information to the model.

This polynomial can then be solved for Q, which may result in two plausible solutions, where one of those solutions is relatively close to the real flow-value. However, based on the analytical model and the current parameter values alone it is difficult, if not impossible, to reliably and accurately determine which of the plausible solutions is the correct solution.

Therefore, in some embodiments, these two solutions, i.e. the two (or more), resulting flow estimate values, are fed as additional parameters into the computation machine learning model.

Embodiments of the method described herein can be implemented by means of hardware comprising several distinct elements, and/or at least in part by means of a suitably programmed microprocessor. In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A computer-implemented method for determining a flow rate of fluid flow at a target time through a centrifugal pump driven by a pump motor controlled by a processor, the method comprising:
receiving via the processor at least one set of previous parameter values including a first previously detected parameter value indicative of a first operational parameter of the pump motor at a previous time earlier than a target time, and a second previously detected parameter value indicative of a second operational parameter of the pump motor at the previous time;
receiving via the processor a current set of parameter values including a first currently detected parameter value indicative of the first operational parameter of the pump motor at the target time and a second currently detected parameter value indicative of the second operational parameter of the pump motor at the target time;
computing the flow rate of fluid flow through the pump at the target time via the processor from the current set of parameter values and from the at least one set of previous parameter values without reference to hydraulic parameters of fluid flowing through the pump, wherein the flow rate of fluid flow at the target time is computed by a machine learning model that compares the at least one set of previous parameter values at the previous time with the current set of parameter values at the current time.

2. The computer-implemented method according to claim 1, further comprising receiving a plurality of sets of previous parameter values, each set of the previous parameter values being indicative of the first and second operational parameters of the pump motor at respective previous times, each previous respective previous time being earlier than the target time.

3. The computer-implemented method according to claim 1, wherein the first operational parameter is indicative of a frequency or rotational speed of the pump motor.

4. The computer-implemented method according to claim 1, wherein the second operational parameter is indicative of electrical power of the pump motor.

5. The computer-implemented method according to claim 1, wherein the second operational parameter is indicative of an electrical current fed into the pump motor.

6. The computer-implemented method according to claim 1, wherein the current set of parameter values and each set of the previous parameter values include parameter values of a third operational parameter of the pump motor.

7. The computer-implemented method according to claim 6, wherein, in addition to a parameter value indicative of the first operational parameter, the current set of parameter values and each set of previous parameter values includes parameter values of the electrical power of the pump motor and of the electrical current fed into the pump motor.

8. The computer-implemented method according to claim 1, wherein the machine learning model maintains an internal state stored in a digital memory, and further wherein computation of the flow rate of the pump at the target time is based on the current set of parameter values and on a previously calculated internal state, wherein the previously calculated internal state of the dynamic model depends on the at least one set of previous parameter values.

9. The computer-implemented method according to claim 8, further comprising computing via the processor a current internal state of the machine learning model from the current set of parameter values and from the previously calculated internal state, storing the current internal state being maintained in digital memory, and computing via the processor, from a subsequent set of parameter values and from the current internal state, a subsequent internal state and a subsequent flow rate at a subsequent target time.

10. The computer-implemented method according to claim 1, wherein the machine learning model comprises a recurrent neural network model.

11. The computer-implemented method according to claim 10, wherein the machine learning model comprises a neural network model, and further wherein the neural network model comprises a recurrent portion and one or more feed-forward portions.

12. A computing system comprising a memory and at least one processor, the computing system being configured to perform steps of the method according to claim 1.

13. A processor-readable tangible non-transient medium storing a computer program for operating a pump motor operably coupled to a pump, the computer program comprising executable computer code to perform steps of the computer-implemented method according to claim 1 to operate the pump motor.

14. A pump system comprising a pump operably coupled to a pump motor and a processor operably coupled to the pump motor, wherein the processor is programmed to carry out steps of the method of claim 1.

15. The computer implemented method according to claim 1, wherein the pump is a centrifugal pump.

16. The computer implemented method according to claim 11, wherein the neural network model comprises at least one convolutional network layers followed by at least one recurrent network layer.

17. The computer implemented method according to claim 1, wherein the machine learning model includes an LSTM network or GRU network.

18. The computer implemented method according to claim 1, wherein the machine learning model includes a GRU network.

19. The computer implemented method according to claim 1, wherein the machine learning model includes a recurrent neural network wherein connections between nodes of the recurrent neural network form a directed graph along a temporal sequence to permit the machine learning model to temporal dynamic behavior.

* * * * *